United States Patent
Murillo Amaya et al.

(10) Patent No.: US 9,185,363 B2
(45) Date of Patent: Nov. 10, 2015

(54) VEHICLE IMAGING SYSTEM AND METHOD FOR CATEGORIZING OBJECTS USING RELATIVE MOTION ANALYSIS

(71) Applicant: Gentex Corporation, Zeeland, MI (US)

(72) Inventors: Sergio E. Murillo Amaya, Holland, MI (US); David M. Falb, Grand Rapids, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 14/185,283

(22) Filed: Feb. 20, 2014

(65) Prior Publication Data
US 2014/0247351 A1    Sep. 4, 2014

Related U.S. Application Data

(60) Provisional application No. 61/771,315, filed on Mar. 1, 2013.

(51) Int. Cl.
*H04N 7/18* (2006.01)
*B60Q 1/08* (2006.01)
*G06K 9/00* (2006.01)

(52) U.S. Cl.
CPC ............ *H04N 7/183* (2013.01); *B60Q 1/085* (2013.01); *G06K 9/00798* (2013.01); *G06K 9/00825* (2013.01)

(58) Field of Classification Search
CPC ........... G06K 9/00825; G06K 9/00798; B60Q 1/085; H04N 7/183; G06T 7/20
USPC .......................................... 348/148; 701/117
See application file for complete search history.

(56) References Cited

U.S. PATENT DOCUMENTS

| | | |
|---|---|---|
| 4,862,037 A | 8/1989 | Farber et al. |
| 5,086,253 A | 2/1992 | Lawler |
| 5,562,336 A | 10/1996 | Gotou |

(Continued)

FOREIGN PATENT DOCUMENTS

| | | |
|---|---|---|
| JP | 2007045407 | 2/2007 |
| KR | 100784863 | 12/2007 |
| WO | WO2012145819 | 11/2012 |

OTHER PUBLICATIONS

Yen-Lin Chen; Bing-Fei Wu; Hao-Yu Huang; Chung-Jui Fan, "A Real-Time Vision System for Nighttime Vehicle Detection and Traffic Surveillance," in Industrial Electronics, IEEE Transactions on, vol. 58, No. 5, pp. 2030-2044, May 2011.*

(Continued)

*Primary Examiner* — William C Vaugh, Jr.
*Assistant Examiner* — Naod Belai
(74) *Attorney, Agent, or Firm* — Price Heneveld LLP; Scott P. Ryan

(57) ABSTRACT

An imaging system is provided for a vehicle. The imaging system includes: an imager configured to image a forward external scene of the controlled vehicle and to generate image frame data corresponding to each frame of a series of acquired image frames; and a processor configured to receive and analyze the image frame data to detect a dominant scene motion and to determine relative motion of objects as compared to the dominant scene motion, and wherein the analysis of the image frame data performed by the processor includes categorizing objects detected in the image frame data using the relative motion of those objects.

15 Claims, 5 Drawing Sheets

(56) References Cited

U.S. PATENT DOCUMENTS

| | | | |
|---|---|---|---|
| 5,796,094 A * | 8/1998 | Schofield et al. | 250/208.1 |
| 5,837,994 A | 11/1998 | Stam et al. | |
| 6,049,171 A | 4/2000 | Stam et al. | |
| 6,097,023 A * | 8/2000 | Schofield et al. | 250/208.1 |
| 6,130,421 A | 10/2000 | Bechtel et al. | |
| 6,144,158 A | 11/2000 | Beam | |
| 6,205,260 B1 | 3/2001 | Crinon et al. | |
| 6,587,573 B1 | 7/2003 | Stam et al. | |
| 6,611,610 B1 | 8/2003 | Stam et al. | |
| 6,774,988 B2 | 8/2004 | Stam et al. | |
| 7,004,606 B2 | 2/2006 | Schofield | |
| 7,565,006 B2 | 7/2009 | Stam et al. | |
| 7,613,327 B2 | 11/2009 | Stam et al. | |
| 7,669,636 B1 | 3/2010 | Yuter | |
| 7,920,959 B1 | 4/2011 | Williams | |
| 8,045,760 B2 | 10/2011 | Stam et al. | |
| 8,232,895 B2 | 7/2012 | Kamioka | |
| 2002/0060522 A1 | 5/2002 | Stam et al. | |
| 2003/0107323 A1 | 6/2003 | Stam | |
| 2004/0131233 A1 * | 7/2004 | Comaniciu et al. | 382/104 |
| 2010/0002081 A1 * | 1/2010 | Pawlicki et al. | 348/148 |
| 2010/0060169 A1 | 3/2010 | Sugimoto et al. | |
| 2010/0073480 A1 * | 3/2010 | Hoek et al. | G01P 1/08 348/148 |
| 2010/0157614 A1 | 6/2010 | Hue et al. | |
| 2011/0075435 A1 | 3/2011 | Robert et al. | |
| 2011/0260618 A1 | 10/2011 | Mueller et al. | |
| 2011/0280026 A1 | 11/2011 | Higgins-Luthman | |
| 2012/0330528 A1 * | 12/2012 | Schwindt et al. | 701/96 |

OTHER PUBLICATIONS

Patent Cooperation Treaty, International Searching Authority, International Search Report, Written Opinion of the International Searching Authority and Notification of Transmittal, Jun. 10, 2014, 7 Pages.

* cited by examiner

VEHICLE IMAGING SYSTEM AND METHOD FOR CATEGORIZING OBJECTS USING RELATIVE MOTION ANALYSIS

CROSS-REFERENCE TO RELATED APPLICATION

This application claims priority to and the benefit under 35 U.S.C. §119(e) of U.S. Provisional Patent Application No. 61/771,315, filed on Mar. 1, 2013, entitled "SYSTEM AND METHOD FOR CONTROLLING VEHICLE FORWARD LIGHTING USING RELATIVE MOTION ANALYSIS," the entire disclosure of which is hereby incorporated herein by reference.

FIELD OF THE INVENTION

The present invention generally relates to a system and method for imaging and categorizing objects in a scene forward of a vehicle.

SUMMARY OF THE INVENTION

According to one aspect of the present invention, an imaging system is provided for a vehicle. The imaging system comprises: an imager configured to image a scene external and forward of the vehicle and to generate image frame data corresponding to each frame of a series of acquired image frames; and a processor configured to receive and analyze the image frame data to detect a dominant scene motion and to determine relative motion of objects relative to the dominant scene motion, and wherein the analysis of the image frame data performed by the processor includes categorizing objects detected in the image frame data using the relative motion of those objects.

According to another aspect of the present invention, a method is provided for categorizing objects detected in a scene forward of a vehicle. The method comprises: imaging a scene external and forward of the controlled vehicle and generating image frame data corresponding to each frame of a series of acquired image frames; and receiving and analyzing the image frame data in a processor to detect a dominant scene motion to determine relative motion of objects relative to the dominant scene motion, and to categorize objects detected in the image frame data using the relative motion of those objects.

According to another aspect of the present invention, a non-transitory computer readable medium is provided having stored thereon software instructions that, when executed by a processor, cause the processor to categorize objects in a scene forward of a vehicle, by executing the steps comprising: imaging a scene external and forward of the vehicle and generating image data corresponding to each frame of a series of acquired image frames; and receiving and analyzing the image frame data in a processor to detect a dominant scene motion, to determine relative motion of objects relative to the dominant scene motion, and to categorize objects detected in the image frame data using the relative motion of those objects.

These and other features, advantages, and objects of the present invention will be further understood and appreciated by those skilled in the art by reference to the following specification, claims, and appended drawings.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

Figure 1:
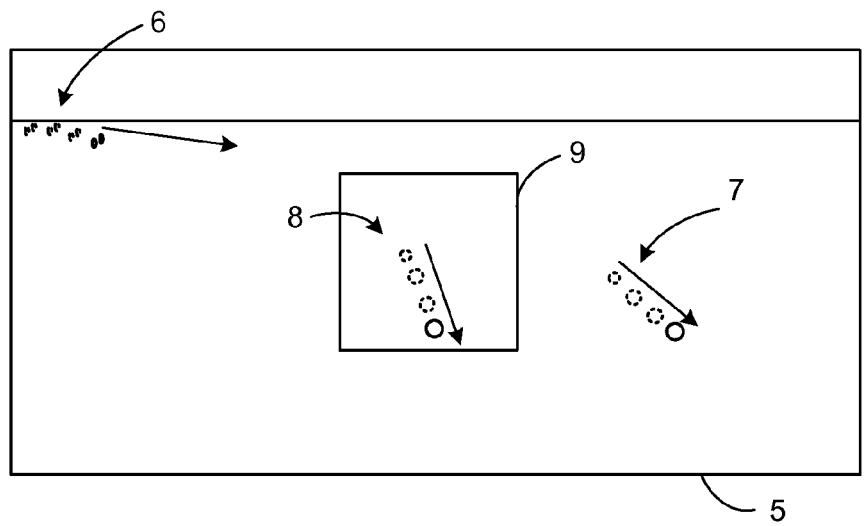
FIG. 1 is a representative pictorial view of an imaged scene taken in several superimposed frames.

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system for a vehicle and a method of categorizing objects in a scene forward of the vehicle. To assist in the understanding of an application of these embodiments, examples are provided that pertain to the use of the imaging system in an exterior light control system for controlling exterior lights of a controlled vehicle in response to image data acquired from an image sensor, which captures images forward of the vehicle. Adaptive Main Beam Control (ADB) and alternate methods of controlling the light beam illumination in front of a motor vehicle maximize the use of high beams at night by identifying oncoming and preceding vehicles and automatically controlling the high beam lighting pattern. This prevents glare to other vehicles, yet maintains a high beam light distribution to illuminate areas not occupied by other vehicles. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the controller would respond by changing the state of the exterior lights so as to not cause glare for the other driver(s). Glare to other drivers can be prevented by moving a blocking mechanism in the high beam headlamps that blocks portions of the light otherwise generated by the headlamps from projecting in selected glare-free regions of the forward scene. Examples of such systems are described in U.S. Pat. Nos. 5,837,994, 5,990,469, 6,008,486, 6,049,171, 6,130,421, 6,130,448, 6,166,698, 6,255,639, 6,379,013, 6,403,942, 6,587,573, 6,593,698, 6,611,610, 6,631,316, 6,653,614, 6,728,393, 6,774,988, 6,861,809, 6,906,467, 6,947,577, 7,321,112, 7,417,221, 7,565,006, 7,567,291, 7,653,215, 7,683,326, 7,881,839, 8,045,760, 8,120,652, and 8,543,254, the entire disclosures of which are incorporated herein by reference.

U.S. Pat. No. 8,543,254 discloses an exterior light control system that improves upon the prior systems by determining a road model based on the roadway width and roadway type (i.e., motorway, two-lane road, multi-lane road, etc.) in order to more accurately discriminate between other vehicles and non-vehicle light sources, reflectors, and road signs and to allow different modes of operation depending upon the type of roadway on which the controlled vehicle is traveling. More specifically, the roadway width may be estimated from various objects detected in the forward scene, including lane markers, reflectors, road signs, and any other objects that may be useful to detect the edges of the road. The roadway type may be determined from the roadway width. Other vehicle parameters such as vehicle speed, yaw, roll, steering wheel position and vehicle direction may also be used when determining the roadway type and the road model. Then, using the road model, the system may track the positioning (or "world positioning") relative to the controlled vehicle, the movement, the brightness, the size, the color, and other characteristics of various detected light sources to determine if the light sources appear to be on the roadway. If so, the light sources are more likely to be another vehicle to which the system responds by appropriately controlling the exterior lights.

Figure 6:
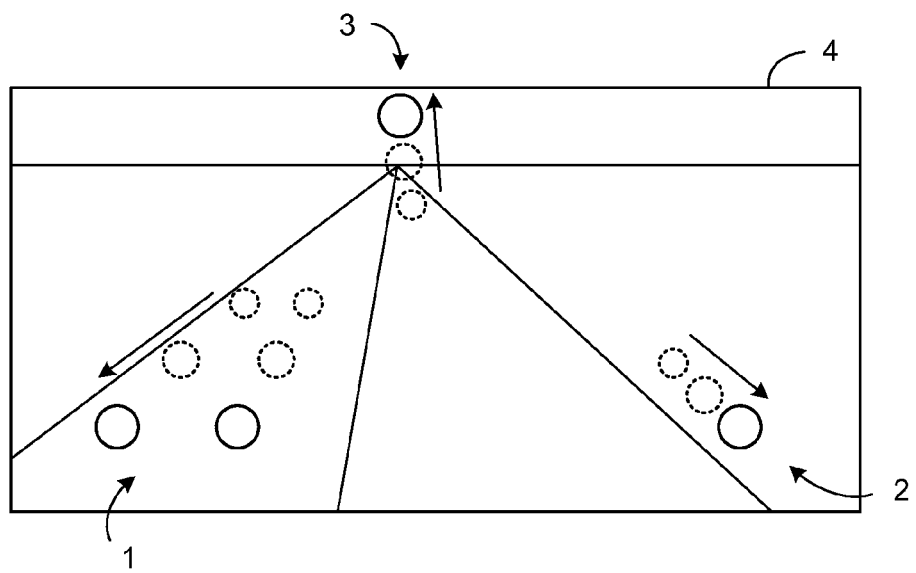
FIG. 6 is another representative pictorial view of an imaged scene taken in several superimposed frames.

Commonly assigned U.S. Pat. No. 6,587,573 discloses an exterior light control system that uses motion analysis to sense turning of the vehicle and to determine the rate of overtaking a preceding vehicle or the rate at which a preceding vehicle may drive out of range to thereby enable additional control over the headlamps. Motion analysis is also disclosed as being used to distinguish between signs, reflectors, street lights, and headlights and tail lights of vehicles based on the movement of the objects in the image over time (i.e., over a sequence of frames). To achieve such motion analysis, light list history is maintained that lists objects detected in each captured frame of the forward scene. The light list for each frame includes, for each object: an index uniquely identifying the object relative to other objects in the frame, an X coordinate of the center of the object; a Y coordinate of the center of the object; a sum of all the gray scale values of all pixels in the object; the total number of pixels in the object; the gray scale value of the brightest pixel; the brightness ratio between the clear and the red images for this object; the index of a light in a previous frame which is the same light as this one (if any); the gain of the image in the cycle—high, medium, or low gain; and a vector representing the direction in which the light is traveling. The movement vector is determined when an object in a previous light list for a prior image frame is determined to be the same object as in the current light list. The motion vector quantifies the rate and direction of motion of the object. As illustrated in FIG. 6, the headlights 1 of oncoming vehicles tend to move down and to the left of the image over a sequence of frames 4, while signs and reflectors 2 tend to move down and to the right. Overhead street lights 3 tend to move upward. Other techniques are disclosed for distinguishing between these objects that when used with motion detection, can further increase the accuracy at which the system is able to make such distinctions. For example, the system may determine that a nearby headlamp is present when the detected headlamp has high brightness and a relatively high amount of motion. A distant headlamp, on the other hand, would have low brightness and a relatively low amount of motion. A sign would have a low level of brightness but have a relatively high amount of motion.

The embodiment described below improves upon the above described system of U.S. Pat. No. 6,587,573 in that it performs a motion analysis that is relative to a dominant motion of the forward scene, whereas the prior systems determined motion relative to the controlled vehicle. By taking into account the dominant scene motion, the imaging system described herein is able to more accurately identify vehicles traveling on a traffic circle or roundabout, on another road that intersects the road upon which the controlled vehicle is traveling, as well as oncoming or preceding vehicles that are on a curve in the road or otherwise coming off of such a curve, such as oncoming vehicle 6 identified in FIG. 1, relative to a field of view 5 of an image sensor. Oncoming vehicles approaching on a curve, roundabout, or intersecting road are more difficult to distinguish because they are off-center of the image and the headlights of such vehicles are not directly pointed at the image sensor of the system making the headlights appear dimmer and more distant, thereby making classification more difficult.

When a light of interest is off-center and far from the controlled vehicle, the most telling visual attribute of the light is its motion. Thus, the embodiment described below is designed to measure how lights are moving and to compare them to the scene dominant motion as used as a reference in order to detect the light with the highest relative motion.

Figure 2:
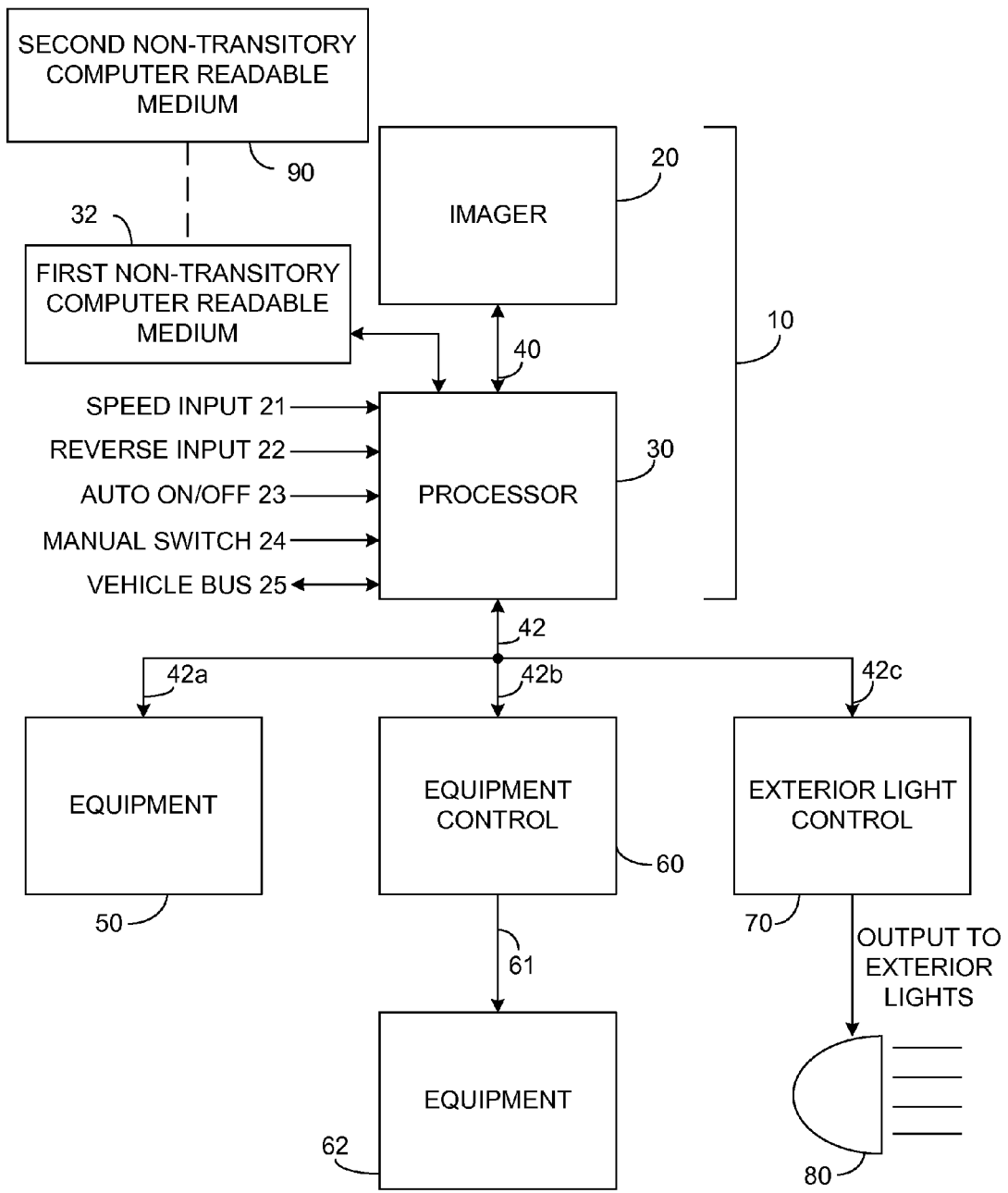
FIG. 2 is a block diagram of a system constructed according to one embodiment.

A first embodiment of an imaging system 10 is shown in FIG. 2. Imaging system 10 may be provided for controlling exterior lights 80 and, optionally, other equipment (50, 62) of a vehicle. System 10 includes an imager 20 and a processor 30. Imager 20 includes an image sensor (201, FIG. 3) that is configured to image a scene external and forward of the vehicle and to generate image data corresponding to the acquired images. Processor 30 receives and analyzes the image data to detect a dominant scene motion and to determine relative motion of objects relative to the dominant scene motion, and wherein the analysis of the image frame data performed by processor 30 includes categorizing objects detected in the image frame data using the relative motion of those objects. If used in an exterior light control system, processor 30 may generate an exterior light control signal that is used to control exterior lights 80 and may generate control signals to control any additional equipment (50, 62). These control signals are generated in response to analysis of the image data.

If imaging system 10 is used in a vehicle equipment control system, processor 30 may be configured to directly connect to the equipment 50 being controlled such that the generated control signals directly control the equipment 50. Alternatively, processor 30 may be configured to connect to an equipment control (60 and 70), which, in turn, is connected to the equipment being controlled (62 and 80) such that the control signals generated by processor 30 only indirectly control the equipment 62 and 80. For example, in the case of the equipment being exterior lights 80, processor 30 may analyze the image data from imager 20 so as to generate control signals that are more of a recommendation for an exterior light control 70 to use when controlling exterior lights 80. Thus, it can be said that the control signals are used to control the equipment. The control signals may further include not just a recommendation, but also a code representing a reason for the recommendation so that equipment control (60 and 70) may determine whether or not to override a recommendation.

As shown in FIG. 2, various inputs (such as inputs 21-24) may be provided to processor 30 that may be taken into account in analyzing the image data or forming a recommendation or direct control signal. In some cases, such inputs may instead be provided to equipment controls (60 and 70). For example, input from manual switches may be provided to equipment controls (60 and 70), which may allow equipment controls (60 and 70) to override a recommendation from processor 30. It will be appreciated that various levels of interaction and cooperation between processor 30 and equipment controls (60 and 70) may exist. One reason for separating control functions is to allow imager 20 to be located in the best location in the vehicle for obtaining images, which may be a distance from the equipment to be controlled and to allow communication over the vehicle bus 25.

According to one embodiment, the equipment that imaging system 10 controls may include one or more exterior lights 80 and the control signal generated by processor 30 may be an exterior light control signal. In this embodiment, exterior lights 80 may be controlled directly by processor 30 or by an exterior light control 70, which receives a control signal from processor 30. As used herein, the "exterior lights" broadly includes any exterior lighting on the vehicle. Such exterior lights may include headlamps (both low and high beam if separate from one another); tail lights; and foul weather lights such as fog lights, brake lights, center-mounted stop lights (CHMSLs), turn signals, back-up lights, etc. The exterior lights may be operated in several different modes including conventional low-beam and high-beam states. They may also be operated as daytime running lights, and additionally as super-bright high beams in those countries where they are permitted.

The brightness of the exterior lights may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imager 20 may be any conventional imager. Examples of suitable imagers are disclosed in published United States Patent Application Publication Nos. US 20080192132 A1 and US 20120072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" filed on Oct. 7, 2011, by Jon H. Bechtel et al.; and 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The imager 20 includes an image sensor (or camera) to capture images that may then be displayed and/or analyzed in order to categorize objects or to optionally control vehicle equipment such as exterior lights. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSTEM AND METHOD THEREOF" filed on Jul. 27, 2011, by Brock R. Rycenga et al., and 61/512,158 entitled "COLLISION WARNING SYSTEM AND METHOD THEREOF" filed on Jul. 27, 2011, by Brock R. Rycenga et al., which together correspond to published United States Patent Application Publication Nos. US 20130028473 A1, the entire disclosures of which are incorporated herein by reference.

In the example shown in FIG. 2, imager 20 may be controlled by processor 30. Communication of imager parameters as well as image data occurs over communication bus 40, which may be a bi-directional serial bus, parallel bus, a combination of both, or other suitable means. Processor 30 may perform equipment control functions by analyzing images from imager 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Processor 30 may control the imager to be activated in several different modes with different exposure times and different readout windows. Processor 30 may be used to both perform the equipment or exterior light control function and control the parameters of imager 20.

Processor 30 can also take advantage of the availability of signals (such as vehicle speed, steering wheel angle, pitch, roll, and yaw) communicated via the vehicle bus 25 (or optionally via discrete connections) in making decisions regarding the operation of the exterior lights 80. In particular, speed input 21 provides vehicle speed information to the processor 30 from which speed can be a factor in determining the control state for the exterior lights 80 or other equipment. The reverse signal input 22 informs processor 30 that the vehicle is in reverse, responsive to which the processor 30 may clear an electrochromic mirror element regardless of signals output from light sensors. Auto ON/OFF switch input 23 is connected to a switch having two states to dictate to processor 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42*a*, 42*b*, and 42*c*, as well as any other possible inputs or outputs, such as a steering wheel input, can optionally be provided through vehicle bus 25 shown in FIG. 2. Alternatively, these inputs 21-24 may be provided to equipment control 60 or exterior light control 70. Thus, for example, the auto ON/OFF switch input 23 may instead be delivered to, and arbitrated by, exterior light control 70 rather than processor 30.

Processor 30 can control or interact with, at least in part, other equipment 50 within the vehicle which is connected to processor 30 via vehicle bus 42. Specifically, the following are some examples of one or more equipment 50 that may be controlled by processor 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, processor 30 may be, at least in part, located within a rearview assembly of a vehicle or located elsewhere within the vehicle. The processor 30 may also use a second processor (or processors) such as equipment control 60, which may be located in a rearview assembly or elsewhere in the vehicle in order to control certain kinds of equipment 62. Equipment control 60 can be connected to receive via vehicle bus 42 control signals generated by processor 30. Equipment control 60 subsequently communicates and controls equipment 62 via bus 61. For example, equipment control 60 may be a windshield wiper control unit which controls windshield wiper equipment, turning this equipment ON or OFF. Equipment control 60 may also be an electrochromic mirror control unit where processor 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with processor 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation system, vehicle speed, interior lights, rearview mirrors, an audio system, climate control, engine control, and various other switches and other display devices that may be located throughout the vehicle.

Figure 3:
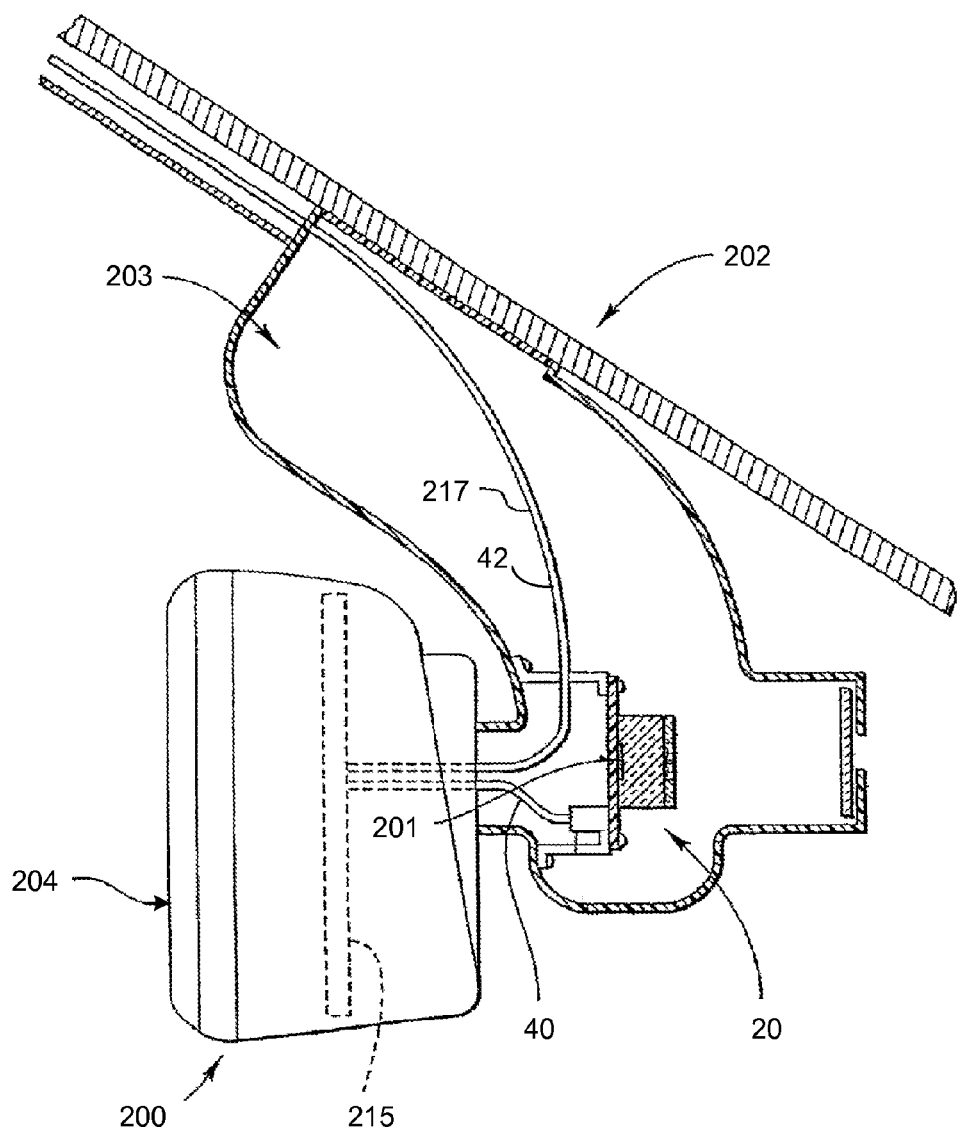
FIG. 3 is a partial cross section of a rearview assembly incorporating a system in accordance with another embodiment.

Portions of imaging system 10 can be advantageously integrated into a rearview assembly 200 as illustrated in FIG. 3, wherein imager 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imager 20 in the rearview assembly 200 permits sharing of circuitry such as the power supply, microcontroller and light sensors.

Referring to FIG. 3, image sensor 201 is mounted within rearview mount 203, which is mounted to vehicle windshield 202. The rearview mount 203 provides an opaque enclosure for the image sensor with the exception of an aperture through which light is received from a forward external scene.

Processor 30 of FIG. 2 may be provided on a main circuit board 215 and mounted in rearview housing 204 as shown in FIG. 2. As discussed above, processor 30 may be connected to imager 20 by a bus 40 or other means. The main circuit board 215 may be mounted within rearview housing 204 by conventional means. Power and a communication link 42 with the vehicle electrical system, including the exterior lights 80 (FIG. 2), are provided via a vehicle wiring harness 217 (FIG. 3).

Rearview assembly 200 may include a mirror element or a display that displays a rearward view. The mirror element may be a prismatic element or an electro-optic element, such as an electrochromic element.

Additional details of the manner by which imaging system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The method for categorizing objects in a scene forward of a vehicle is described herein as being implemented by processor 30 using image data received from imager 20. This method may be a subroutine executed by any processor, and thus this method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of processor 30 (or locally associated with processor 30 or some other processor) typically prior to being installed in a vehicle, from a second non-transitory computer readable media 90 located remote from first non-transitory computer readable media 32. Second non-transitory computer readable media 90 may be in communication with first non-transitory computer readable media 32 by any suitable means, which may at least partially include the Internet or a local or wide area wired or wireless network.

Figure 4:
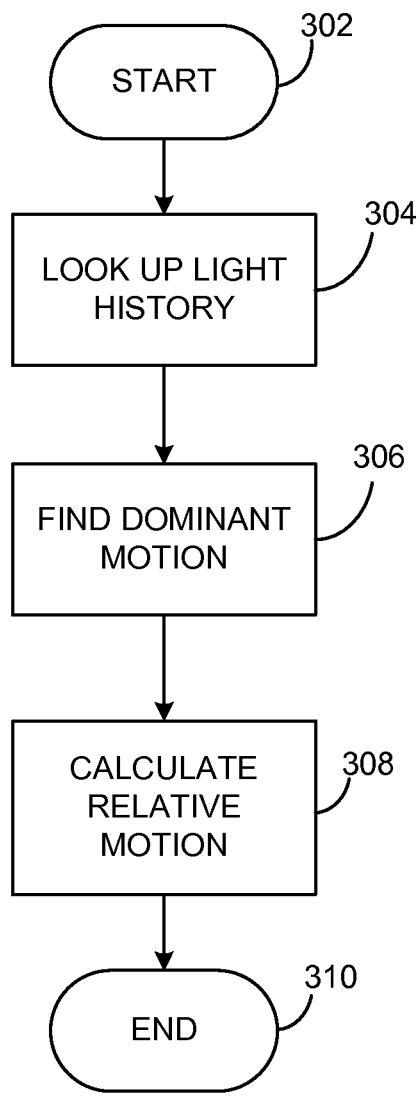
FIG. 4 is a flow chart illustrating a method executed by a processor in the imaging system.

The method for categorizing objects in a scene forward of a vehicle is described below with respect to FIGS. 1, 2, 4, and 5. FIG. 4 shows a flow chart illustrating one example of the method. The method generally includes imaging a scene external and forward of the controlled vehicle and generating image frame data corresponding to each frame of a series of acquired image frames; and receiving and analyzing the image frame data in a processor 30 to detect a dominant scene motion, to determine relative motion of objects as compared to the dominant scene motion, and to categorize objects detected in the image frame data using the relative motion of those objects. If used in an exterior light control system, the method may further include generating a control signal that is used to control the exterior lights in response to analysis of the image frame data. More specifically, the method starts with step 302 and proceeds to step 304 in which processor 30 looks up the stored light list history for a predetermined number of previously captured image frames. Details of step 304 are described further below with respect to FIG. 5. In step 304, processor 30 determines which lights in the light list history are candidates for further relative motion processing. Once the candidates are identified, processor 30 determines the dominant motion of the scene in step 306. Then in step 308, processor 30 calculates the relative motion of each of the candidate objects and stores a relative motion coefficient for that object in the light list for the current image frame. The method then ends at step 310, but is repeated for each subsequent image frame acquired from the imager 20.

Processor 30 analyzes the image frame data for the most recently acquired image frame to detect objects having characteristics of a light source, such objects would include oncoming and preceding vehicles, and stationary objects such as street lights, reflectors, signs, and lights from buildings. In general, the system should discriminate between vehicles and stationary objects as there typically is no need to change the light pattern of the exterior lights of the controlled vehicle in response to stationary objects with the exception of changing lighting modes to a village mode or the like, when many street lights are present. To discriminate these objects, processor 30 categorizes the objects typically based on a plurality of factors so as to calculate a probability percentage that the object is a vehicle. These factors may include detected brightness, size, and color of the objects in addition to the relative motion of those objects.

Figure 5:
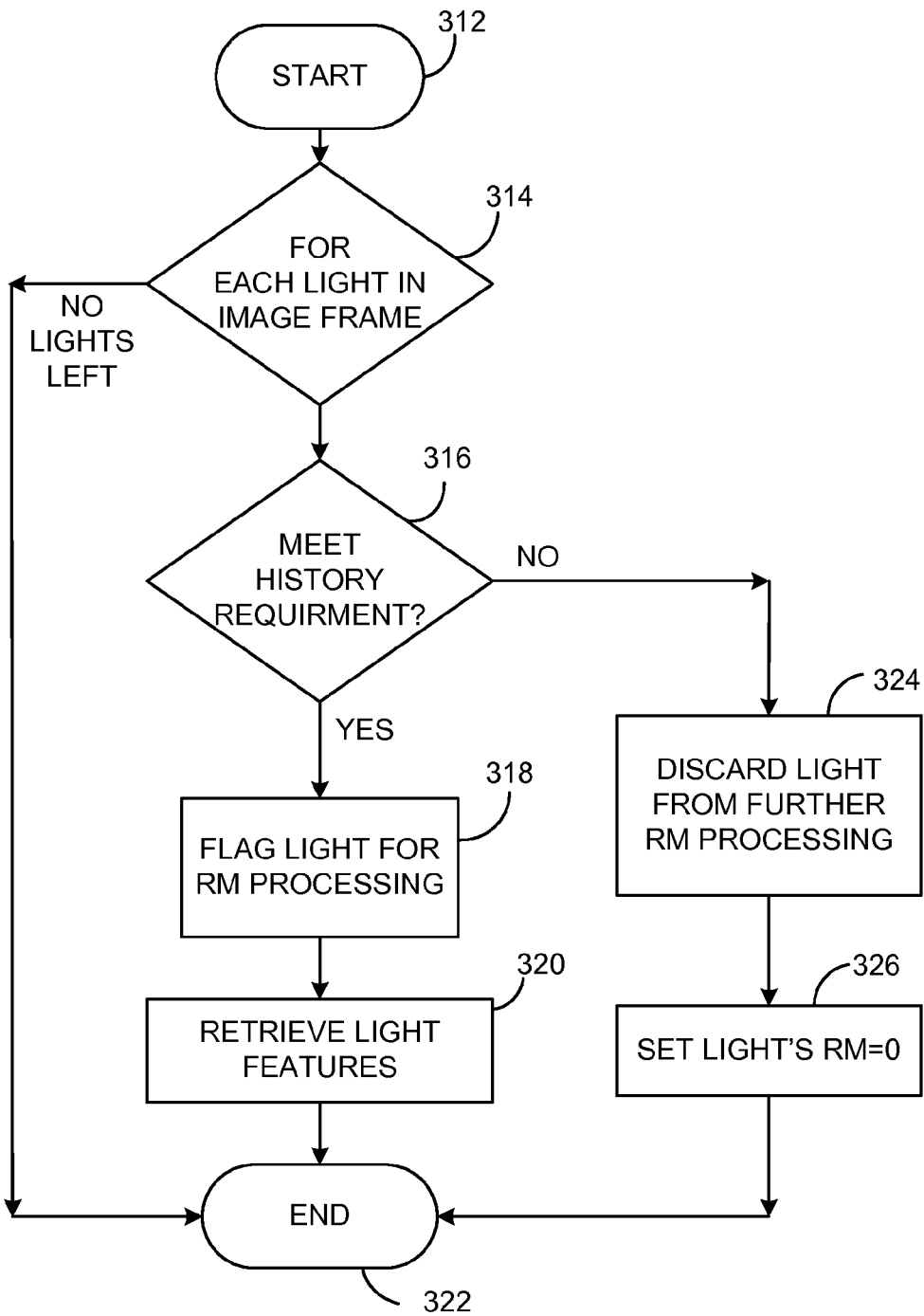
FIG. 5 is a flow chart illustrating a portion of the method executed by a processor in the imaging system.

The steps forming block 304 in FIG. 4 are shown in FIG. 5 and begin with step 312, which is followed by step 314. In step 314, processor 30 reads the light list for the current image frame one object at a time. As of this point, the light list would have already been generated by processor 30 using conventional techniques. Each of the objects in the light list may have stored in association therewith various features that may include: a unique light identification (ID) number identifying the object relative to other objects in the frame; a center of mass coordinates for the object including an X coordinate of the center of the object and a Y coordinate of the center of the object; a size of the object, which may be determined by the total number of pixels in the object; a peak red, blue, and green value of the object (depending upon the image sensor used); the index of a light in a previous frame which is the same light as this one (if any); and age of the light source (how many frames it has appeared in). Additional features that may optionally be stored in association with objects in the light list include: the brightness ratio between corresponding pixels of clear and red images for this object (depending upon the image sensor used); a sum of all the gray scale values of all pixels in the object; the gray scale value of the brightest pixel; the gain of the image in the cycle—high, medium, or low gain; and a vector representing the direction or slope in which the light is traveling.

Upon reading the first object in the light list, processor 30 determines in step 316 whether the object meets a particular history requirement. In the example described herein, the history requirement is whether the object appeared in a configurable number of light lists (e.g., the last four light lists corresponding to the last four image frames). As described below, relative movement is determined for those objects in the current light list that were identified in at least three prior light lists. It is also possible for the history requirement to determine whether the object appeared in a configurable number of image frames out of another configurable number of image frames (e.g., the object appears in four out of the last five image frames). In other words, if looking for an object in at least three prior image frames or light lists, the object need not necessarily appear in consecutive image frames or light lists.

If the history requirement has been met for a particular object, processor 30 sets a flag for relative motion (RM) processing in step 318 before advancing to step 320 in which it retrieves the features stored in association with that object to calculate the vector of movement of the object using the center of mass coordinates from the current light list and the prior three light lists if it had not already been calculated. If the object does not meet the history requirement, processor 30 advances from step 316 to step 324 in which it discards the object from further processing relative to processing of the current image frame and then sets the relative motion coefficient for this object to "0" and the object is not subjected to RM processing.

If there are no lights left to process in the light list for the current image frame, the process ends in step 322, in which case processor 30 executes step 306 in FIG. 4. If there are additional objects in the light list, processor 30 continues to determine whether the objects are candidates for RM processing by executing steps 314-326 until all objects have been identified as either a candidate or not a candidate.

Referring back to FIG. 4, processor 30 executes step 306 in which it determines the dominant scene motion. To determine the dominant scene motion, processor 30 analyzes light sources present within a central window 9 such as a lane marker 8 and other light sources (FIG. 1) over a sequence of four image frames. In this particular example, light sources outside of central window 9 are not used for determining the dominant motion of the scene. Central window 9 may have a fixed size of, for example, 150×150 pixels and may be centered within the imaged scene 5 at an auto-aim center point. The auto-aim center point may be determined using known techniques. In particular, known imaging systems automatically adjust the aim of the image sensor based upon detection of particular objects in the imaged scenes. Such objects may include lane markers (and particularly where they appear to converge in the distance), taillights, street lights, and portions of the exterior of the vehicle itself that may be within the captured image. Examples of such systems are disclosed in U.S. Pat. Nos. 6,049,171, 7,881,839, and 7,720,580 and in published United States Patent Application Publication No. US 20130332034 A1, the entire disclosures of which are incorporated herein by reference.

The objective of the dominant motion analysis is to find the motion pattern followed by most of the lights inside central window 9 (FIG. 1). As but one example of how such dominant motion may be determined, a technique may be employed that utilizes a "chain code" that indicates how a light source is moving. Using the auto-aim center as the coordinate origin, the various directions that a light source could move relative to that origin may be categorized into directional octants somewhat analogous to heading octants E, NE, N, NW, W, SW, S, and SE, but represented instead by a numerical value 0-8, respectively, where "0" represents no movement. The chain code is a three-digit chain of directional codes represented by numerical values 0-8 where each digit is the movement between each sequential pair of the four frames. Thus, a chain code of "888," for example, would represent three consecutive movements in direction "8," which would correspond to the analogous SE direction relative to the origin at the center of central window 9. The chain codes may be determined using differences of the center of mass of a light source from one image frame to the next.

Processor 30 may then select the chain code that repeats the most from amongst all of the chain codes as the dominant motion candidate. Next, processor 30 may use a dominant motion logic routine that determines whether this dominant motion candidate should be used as the dominant motion. The objective is to have a stable set of lights that are a reliable indicator of the scene's dominant motion. The dominant motion is calculated at every frame, but in order to avoid sharp transitions from frame to frame, the dominant motion logic routine keeps continuity of the dominant motion pattern. This may be accomplished by storing the previously calculated dominant motion and selecting a dominant motion from amongst the top dominant motion candidates that have the same chain code as the previously calculated dominant motion. When there is no dominant motion candidate having the same chain code as the previously calculated dominant motion, processor 30 may select from chain codes having one or two of the same digits as in the chain code representing the previously calculated dominant motion, particularly if the last one or two digits match. If no such chain codes exist, the chain code that repeats the most from amongst all of the chain codes is selected as the dominant motion. All light sources having the same motion as the dominant motion may then be flagged for subsequent reference.

Other techniques may be used to determine dominant motion such as determining the "optical flow" of the scene's dominant motion. One example of determining optical flow of objects in a scene (albeit a rearward scene captured to the side of a vehicle) is disclosed in U.S. Pat. No. 8,004,425, the entire disclosure of which is incorporated by reference.

Once the dominant motion of the scene is determined, processor 30 executes step 308 in which it determines a relative motion coefficient of each of the candidate objects identified in step 304 (including steps 312-326 of FIG. 5) that are outside of central window 9. The relative motion coefficient of each of the candidate objects is determined relative to various aspects of the dominant scene motion as described further below. Because a vehicle 6 (FIG. 1) has a relative motion that deviates considerably from the dominant scene motion (represented by the vector shown by lane marker 8, whereas the relative motion of other objects, such as a roadside reflector 7, does not deviate as much, there is a further basis for distinguishing between such objects. Thus, by measuring deviations from the dominant motion, the system described herein gains another discrimination criterion that may be used to categorize objects such as categorizing light sources as oncoming or preceding vehicles.

The relative motion coefficient or score is a measure of motion differences with respect to the dominant motion. Differences in orientation, magnitude rate, distance and motion, along with slope, size, age, position, and intensity restrictions, can be combined to calculate a score. High values indicate a high relative motion possibly due to headlights or tail lights and low values indicate low relative motion.

Lights that are used to determine the dominant motion are used as a reference to measure the relative motion score Orientation ($O_{score}$) may be determined by a measure of the angle between the motion vector of a light with respect to the dominant motion vector. For example, an orientation score may be determined for each light source where lights moving in parallel with the dominant motion have a score of "0," lights moving in the opposite direction have a score of "1," and all lights having angles in between have values between "0" and "1."

The magnitude rate difference ($Rate_{coeff}$) is a measurement of whether the lights are moving at a faster or slower rate than the dominant motion. Since relative motion seeks to identify oncoming vehicles at far distances, their headlights move slower than the general scene motion. Thus, the idea is to differentiate between objects that move with the scene from objects moving at a slower pace. Usually, lights moving at faster rates are signs at the edge of the scene, lights moving at the same pace as the dominant motion are typically background objects, and lights moving at slower rates could potentially indicate a headlight coming from far away. The slower the motion rate, the higher the value of the magnitude rate score. The magnitude rate score may be computed to be a score between 0 and 1, with 1 representing the slowest rate.

The magnitude distance from center of expansion ($DistMag_{coeff}$) is another factor that may be used to generate the relative motion coefficient. Objects that come closer to the auto-aim center of central window 9 (their distance therefrom decreases) will be assigned higher coefficient values and objects moving away from the auto-aim center (their distance therefrom increases) will have lower coefficient values. Thus, for example, the magnitude distance from center of expansion score may be between 0 and 1 where 0 is assigned for objects moving away from the auto-aim center and scores up to 1 are calculated based upon how close the objects come to the auto-aim center.

The horizontal distance from dominant motion lights ($H_{distcoeff}$) may also be used to calculate the relative motion score. Oncoming vehicles driving on curves turn up close to the image edges. As they start coming off the curves, their horizontal distance to dominant motion lights will decrease. The farther the lights, the higher the coefficient will be. Again, this part of the score may have a value of between 0 and 1.

Another factor that may be used to calculate the relative motion score is a moving away or closer to dominant motion lights score ($MotDir_{coeff}$). This score will assign higher values (again between 0 and 1) to lights that reduce their horizontal distance to the dominant motion lights.

An intensity score ($Int_{coeff}$) may also be determined. Headlights of oncoming vehicles are light sources, and thus they have high intensity values. Dominant motion lights tend to be reflections off the road and signs, which have smaller intensity light values. This intensity score is a measure of the light intensity differences with respect to the intensity of the dominant motion lights. Higher differences will have bigger coefficient values (up to 1). Lights dimmer than the dominant motion lights will be assigned a coefficient value of 0.

A slope coefficient ($Slope_{coeff}$) may also be used. A minimum slope value of, for example, 60 may be set for lights considered for relative motion. In this manner, slopes less than the minimum slope value may have a coefficient of 0 and those above have a scaled value up to 1.

A size coefficient ($Size_{coeff}$) may further be determined. The size of the lights may be measured and averaged over time. Objects coming from far and off-center with respect to the controlled vehicle have smaller sizes than objects that are close to the controlled vehicle. Thus, smaller objects will have higher size coefficients, and larger objects will have smaller values, where large objects having a size greater than a maximum size limit are assigned a coefficient value of 0 and smaller objects have scaled size coefficients up to 1.

Another factor that may be considered in calculating relative motion coefficient is the location of the object in the scene 5. Location flags (TooHighFlag) or (TooLowFlag) may be set to 0 if the object is either too high or too low in the image. Otherwise the flags are set to 1. Therefore, these flags will zero out all lights that are too high or too low in the image in order to avoid high relative motion values for street lights and other nuisance (nonvehicle) light sources.

An age flag (TooOldFlag) may also be set that will zero out lights that have an age that is too old for relative motion calculation. The assumption here is that the system detects headlights relatively fast, thus lights that are too old and that the system does not detect as headlights are very likely nuisances that can be ignored.

Having computed the above coefficients and flags, the relative motion coefficient can be calculated for each light by averaging all of the coefficients, and multiplying by the location and age flags that zero out the relative motion coefficients for lights that meet the conditions to have zero values for those flags. For example, the relative motion coefficient ($RM_{coeff}$) may be calculated using the following equation:

$$RM_{coeff} = [(O_{score} + Rate_{coeff} + DistMag_{coeff} + H_{distcoeff} + MotDir_{coeff} + Int_{coeff} + Slope_{coeff} + Size_{coeff})/8] \times \text{TooHighFlag} \times \text{TooLowFlag} \times \text{TooOldFlag}$$

Because the values of all of the coefficients are between 0 and 1 and are averaged and because the flags are either 0 or 1, $RM_{coeff}$ likewise would have a value between 0 and 1. Although a non-weighted average is taken of the coefficients in this example, it should be appreciated that the average may be a weighted average with the coefficients being weighted differently.

The relative motion coefficient generated as described above, may be used in combination with the other factors mentioned above, when categorizing a light source in a light list. When the relative motion coefficient (i.e., the deviation of object movement from the scene's dominant motion) is large, the object is most likely an oncoming vehicle and the relative motion coefficient may therefore be heavily weighted relative to the other factors. If the relative motion coefficient is small, the other factors, of brightness, color, size, position of center of mass, age, etc. may be more heavily weighted to categorize the object.

Once the steps of FIGS. 4 and 5 have been executed for the current image frame, the process is repeated for each subsequent image frame as the dominant motion of the scene may change with varying curves in the road and because objects come into and leave the scene as the controlled vehicle moves and other vehicles move. It is also possible to smooth the relative motion value of each object over time.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system for a vehicle, comprising:
    an imager configured to image a scene external and forward of the vehicle and to generate image frame data corresponding to each frame of a series of acquired image frames; and
    a processor configured to receive and analyze the image frame data to:
        detect objects in the scene and a dominant motion of the scene, and
        determine relative motion of the detected objects relative to the dominant motion of the scene,
    wherein the analysis of the image frame data performed by said processor includes categorizing the detected objects using the relative motion of the detected objects,
    wherein said processor categorizes objects detected in the image frame data using one or more of a detected brightness, size, position of center of mass, age, and color of the objects in addition to the relative motion of those objects, and
    wherein, when categorizing objects, said processor increases the probability that an object is a vehicle if the object has a high relative motion.

2. The imaging system of claim 1, wherein said processor detects the dominant motion of the scene based upon objects detected in a small central window within the image frames.

3. The imaging system of claim 1, wherein said processor determines the relative motion of objects relative to the dominant motion of the scene in part by determining the movement of each of the objects throughout the series of acquired image frames and then comparing such movement to the dominant motion of the scene.

4. The imaging system of claim 3, wherein said processor generates a light list based upon the analysis of the image frame data, the light list identifying objects in an image frame along with positions of the objects, and wherein said processor maintains a light list history for the series of acquired image frames whereby movement of each of the objects throughout is determined by comparing positions of each of the objects in each light list.

5. The imaging system of claim 4, wherein said processor determines relative movement for those objects in a light list for an image frame that were identified in at least three prior light lists.

6. An exterior light control system for controlling exterior lights of a controlled vehicle, comprising the imaging system of claim 1, wherein said processor generates an exterior light control signal that is used to control the exterior lights in response to analysis of the image data.

7. A method for categorizing objects detected in a scene forward of a vehicle, the method comprising:
    imaging a scene external and forward of the vehicle and generating image frame data corresponding to each frame of a series of acquired image frames; and
    receiving and analyzing the image frame data in a processor to detect objects in the scene and a dominant motion of the scene, to determine relative motion of the detected objects relative to the dominant motion of the scene, and to categorize the detected objects using the relative motion of the detected objects,
    wherein objects detected in the image frame data are categorized using one or more of a detected brightness, size, position of center of mass, age, and color of the objects in addition to the relative motion of those objects, and
    wherein, when categorizing objects, the probability that an object is a vehicle is increased if the object has a high relative motion.

8. The method of claim 7, wherein the relative motion of objects is determined relative to the dominant motion of the scene in part by determining the movement of each of the objects throughout the series of acquired image frames and then comparing such movement to the dominant motion of the scene.

9. The method of claim 8, wherein a light list is generated that identifies objects in an image frame along with positions of the objects, and wherein a light list history is maintained for the series of acquired image frames whereby movement of each of the objects throughout is determined by comparing positions of each of the objects in each light list.

10. The method of claim 9, wherein relative movement is determined for those objects in a light list for an image frame that were identified in at least three prior light lists.

11. A non-transitory computer readable medium having stored thereon software instructions that, when executed by a processor, cause the processor to categorize objects in a scene forward of a vehicle, by executing the steps comprising:
    imaging a scene external and forward of the vehicle and generating image frame data corresponding to each frame of a series of acquired image frames; and
    receiving and analyzing the image frame data in a processor to detect objects in the scene and a dominant motion of the scene, to determine relative motion of the detected objects relative to the dominant motion of the scene, and to categorize the detected objects using the relative motion of the detected objects,
    wherein objects detected in the image frame data are categorized using one or more of a detected brightness, size, position of center of mass, age, and color of the objects in addition to the relative motion of those objects, and
    wherein, when categorizing objects, the probability that an object is a vehicle is increased if the object has a high relative motion.

12. The non-transitory computer readable medium of claim 11, wherein the software instructions further cause the processor to generate a control signal that is used to control exterior lights of the vehicle in response to analysis of the image data.

13. The non-transitory computer readable medium of claim 12, wherein the relative motion of objects is determined relative to the dominant motion of the scene in part by determining the movement of each of the detected objects throughout the series of acquired image frames and then comparing such movement to the dominant motion of the scene.

14. The non-transitory computer readable medium of claim 13, wherein a light list is generated that identifies objects in an image frame along with positions of the objects, and wherein a light list history is maintained for the series of acquired image frames whereby movement of each of the objects throughout is determined by comparing positions of each of the objects in each light list.

15. The non-transitory computer readable medium of claim 14, wherein relative movement is determined for those objects in a light list for an image frame that were identified in at least three prior light lists.

\* \* \* \* \*